US 9,369,078 B2

(12) United States Patent
Gebregergis et al.

(10) Patent No.: US 9,369,078 B2
(45) Date of Patent: Jun. 14, 2016

(54) METHOD OF CURRENT REFERENCE GENERATION FOR A MOTOR

(71) Applicants: Abraham G. Gebregergis, Saginaw, MI (US); Ramakrishnan RajaVenkitasubramony, Saginaw, MI (US); Tomy Sebastian, Saginaw, MI (US); Siddharth Ballal, Saginaw, MI (US)

(72) Inventors: Abraham G. Gebregergis, Saginaw, MI (US); Ramakrishnan RajaVenkitasubramony, Saginaw, MI (US); Tomy Sebastian, Saginaw, MI (US); Siddharth Ballal, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 15 days.

(21) Appl. No.: 13/792,565

(22) Filed: Mar. 11, 2013

(65) Prior Publication Data

US 2014/0253000 A1 Sep. 11, 2014

(51) Int. Cl.
*H02P 21/00* (2006.01)

(52) U.S. Cl.
CPC ............ *H02P 21/0046* (2013.01); *H02P 21/00* (2013.01)

(58) Field of Classification Search
USPC ............. 318/400.01, 400.02, 400.07, 400.14, 318/400.15, 700, 721, 799, 430, 432, 434, 318/437, 801, 400.22; 388/800, 815, 823
See application file for complete search history.

(56) References Cited

U.S. PATENT DOCUMENTS

| 8,018,185 | B2* | 9/2011 | Yamamoto et al. ...... 318/400.15 |
| 8,154,228 | B2* | 4/2012 | Yundt et al. ................... 318/375 |
| 8,744,794 | B2* | 6/2014 | Wu et al. ........................ 702/113 |
| 2005/0057208 | A1 | 3/2005 | Seibel et al. |
| 2006/0132074 | A1 | 6/2006 | Yang et al. |
| 2007/0205743 | A1 | 9/2007 | Takahashi et al. |
| 2009/0059446 | A1 | 3/2009 | Matsui et al. |
| 2009/0295316 | A1* | 12/2009 | Patel et al. ............... 318/400.02 |
| 2010/0219780 | A1 | 9/2010 | Morimoto et al. |
| 2010/0264860 | A1 | 10/2010 | Jun et al. |
| 2011/0043149 | A1 | 2/2011 | Kitanaka |
| 2011/0148335 | A1 | 6/2011 | Harakawa et al. |

(Continued)

FOREIGN PATENT DOCUMENTS

| CN | 1138234 | 12/1996 |
| CN | 1754305 | 3/2006 |

(Continued)

OTHER PUBLICATIONS

European Search Report for EP Application No. 14158557.0 dated Mar. 5, 2015.

(Continued)

*Primary Examiner* — Antony M Paul
(74) *Attorney, Agent, or Firm* — Cantor Colburn LLP

(57) ABSTRACT

A motor control system for determining a reference d-axis current is provided, and includes a motor, a DC power source and DC input lines, and a current command controller. The DC power source generates a bridge voltage across the DC input lines. The current command controller is in communication with the motor and the DC input lines. The current command controller is configured to monitor the bridge voltage and a torque reference command. The current command controller is configured to determine a peak current based on the torque reference command. The current command controller is configured to determine a current angle based on the peak current. The current command controller is configured to determine the reference d-axis current based on the current angle.

20 Claims, 2 Drawing Sheets

(56) References Cited

U.S. PATENT DOCUMENTS

| | | |
|---|---|---|
| 2011/0175558 A1 | 7/2011 | Kitanaka |
| 2011/0241578 A1* | 10/2011 | Kim et al. ............... 318/400.02 |
| 2012/0221280 A1* | 8/2012 | Wu et al. ...................... 702/113 |
| 2014/0265951 A1 | 9/2014 | Gebregergis et al. |

FOREIGN PATENT DOCUMENTS

| | | |
|---|---|---|
| CN | 101479925 | 7/2009 |
| CN | 101507101 | 8/2009 |
| CN | 101902185 | 12/2010 |
| CN | 102545766 | 7/2012 |
| CN | 102594250 | 7/2012 |
| CN | 102694498 | 9/2012 |
| EP | 1115196 A2 | 7/2001 |
| JP | H1198891 A | 4/1999 |
| JP | 2000037098 A | 2/2000 |
| JP | 2004056839 A | 2/2004 |
| JP | 4657215 | 3/2011 |

OTHER PUBLICATIONS

China Patent Application No. 201410145809.3 First Office Action and Search Report issued Dec. 31, 2015, 10 pages.

China Application No. 201410089156.1 First Office Action and Search Report dated Dec. 30, 2015, 9 pages.

CN Patent Application No. 201410092806.8 First Office Action and Search Report issued Feb. 2, 2016, 9 pages.

* cited by examiner

METHOD OF CURRENT REFERENCE GENERATION FOR A MOTOR

BACKGROUND OF THE INVENTION

The present invention relates to a control system for a motor, and more particularly to a control system for a motor that determines a reference d-axis current based on a current angle.

The output torque of an interior permanent magnet synchronous motor (IPMSM) may be determined by a voltage command and a phase advance angle. A specific output torque of the IPMSM is determined by first selecting a specific quadrature axis (also referred to as the q-axis) reference current and a direct axis (also referred to as the d-axis) reference current, and then determining the voltage command and the phase advance angle based on the selected quadrature axis reference current and the direct axis reference current.

SUMMARY OF THE INVENTION

In one embodiment, a motor control system for determining a reference d-axis current is provided, and includes a motor, a DC power source and DC input lines, and a current command controller. The DC power source generates a bridge voltage across the DC input lines. The current command controller is in communication with the motor and the DC input lines. The current command controller is configured to monitor the bridge voltage and a torque reference command. The current command controller is configured to determine a peak current based on the torque reference command. The current command controller is configured to determine a current angle based on the peak current. The current command controller is also configured to determine the reference d-axis current based on the current angle.

In another embodiment, a method of determining a reference d-axis current for a motor is provided. The method includes monitoring a bridge voltage and a torque reference command by a current command controller. The bridge voltage is generated by a DC source across DC input lines. The method includes determining a peak current based on the torque reference command. The method includes determining a current angle based on the peak current. The method also includes determining the reference d-axis current based on the current angle.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
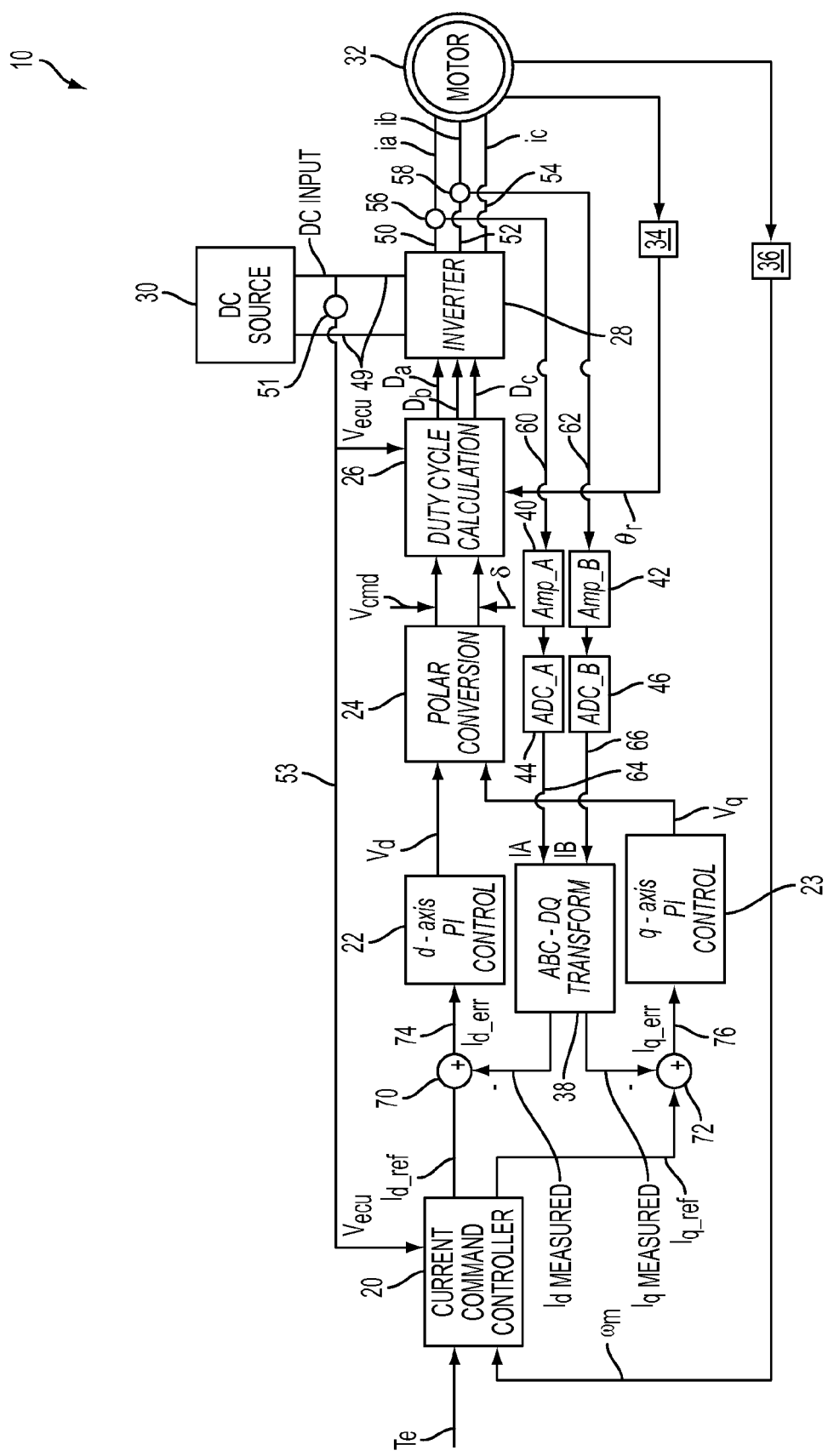
FIG. 1 is a block diagram of a motor control system in accordance with an exemplary embodiment of the invention.

Referring now to the Figures, where the invention will be described with reference to specific embodiments, without limiting same, FIG. 1 is an exemplary block diagram of a motor control system 10. The motor control system 10 includes a command current controller 20, a d-axis proportional plus integral gain (PI) controller 22, a q-axis PI controller 23, a polar conversion controller 24, a pulse width modulation (PWM) inverter controller 26, an inverter 28, a DC power source 30, a motor 32, a position sensor 34, a speed sensor 36, a transform controller 38, an a-axis current amplifier 40, a b-axis current amplifier 42, an a-axis analog to digital converter (ADC) 44, and a b-axis ADC 46. In one embodiment, the motor 32 may be an interior permanent magnet synchronous motor (IPMSM), however it is to be understood that any type of electric motor that is controlled using phase current may be used as well.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the command current controller 20 and the PWM inverter controller 26. In the exemplary embodiment as shown, the inverter 26 transmits three alternating current (AC) phase currents to the motor 32 (e.g., $i_a$, $i_b$, and $i_c$) by line 50, line 52, and line 54 for operation and control of the motor 32.

For feedback control purposes, the phase currents $i_a$ and $i_b$ transmitted to the motor 32 by lines 50 and 52 may be detected to determine the instantaneous current flow to the motor 32. Specifically, a transducer 56 may be used to monitor the phase current $i_a$ on the line 50, and a transducer 58 may be used to monitor the phase current $i_b$ on the line 52. It should be noted that although transducer 56 and transducer 58 are illustrated, only one of the lines 50 or 52 may be monitored to measure either phase current $i_a$ or phase current $i_b$. A control signal 60 representing the measured phase current $i_a$ may be sent to the a-axis current amplifier 40 from the transducer 56, and a control signal 62 representing the measured phase current $i_b$ may be sent to the b-axis current amplifier 42 from the transducer 58. An augmented or amplified value of the phase current $i_a$ is then sent to the a-axis ADC 44 from the a-axis current amplifier 40, and an amplified value of the phase current $i_b$ 62 is sent to the b-axis ADC 46 from the b-axis current amplifier 42. The a-axis ADC 44 converts the amplified value of the phase current $i_a$ into a digital value 64. The digital value 64 represent the magnitude of the phase current $i_a$. The b-axis ADC 46 converts the amplified value of the phase current $i_b$ into a digital value 66. The digital value 66 represents the magnitude of the phase current $i_b$.

The transform controller 38 receives as input the digital value 64 from the ADC 44 and the digital value 66 from the ADC 46. In one embodiment, the transform controller 38 is a three-phase to two-phase transformation controller where measured values for the AC current (e.g., the digital value 64 representing the phase current $i_a$ and the digital value 66 representing the phase current $i_b$) are converted into equivalent measured DC current components, which are a measured d-axis current $I_{dMEASURED}$ and a measured q-axis current $I_{qMEASURED}$. The measured d-axis current $I_{dMEASURED}$ is sent to a subtractor 70 and the measured q-axis current $I_{qMEASURED}$ is sent to a subtractor 72.

The command current controller 20 receives as input a torque reference command $T_e$, an angular speed $\omega_m$, and the control signal 53 representing the bridge voltage $V_{ecu}$ from the transducer 51. The torque reference command $T_e$ represents a commanded torque value, and may be derived from another controller (not shown), or may correspond to a torque value generated by an operator. The angular speed $\omega_m$ is measured by the speed sensor 36. The speed sensor 36 may include, for example, an encoder and a speed calculation circuit for calculating the angular speed of a rotor (not shown) of the motor 32 based on a signal received by the encoder. The command current controller 20 calculates a reference d-axis current $I_{d\_REF}$ and a reference q-axis current $I_{q\_REF}$ based on the torque command $T_e$, the bridge voltage $V_{ecu}$, and the angular speed $\omega_m$, which is described below. The reference d-axis current $I_{d\_REF}$ is sent to the subtractor 70, and the reference q-axis current $I_{q\_REF}$ is sent to the subtractor 72.

The subtractor 70 receives the measured d-axis current $I_{dMEASURED}$ and the reference d-axis current $I_{d\_REF}$. The subtractor 70 determines a d-axis error signal 74 based on the measured d-axis current $I_{dMEASURED}$ and the reference d-axis current $I_{d\_REF}$. The d-axis error signal 74 represents the error between the measured d-axis current $I_{dMEASURED}$ and the reference d-axis current $I_{d\_REF}$. The subtractor 72 receives the measured q-axis current $I_{dMEASURED}$ and the reference q-axis current $I_{q\_REF}$. The subtractor 72 determines a q-axis error signal 76 based on the measured q-axis current $I_{dMEASURED}$ and the reference q-axis current $I_{q\_REF}$. The q-axis error signal 76 represents the error between the measured q-axis current $I_{dMEASURED}$ and the reference q-axis current $I_{q\_REF}$.

The d-axis PI controller 22 receives as input the d-axis error signal 74 from the subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the subtractor 72. The q-axis PI controller 23 calculates a q-axis voltage signal $V_Q$. The q-axis voltage signal $V_Q$ is based on a q-axis proportional gain $K_P$, and a q-axis integral gain $K_i$.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle $\delta$. The PWM inverter controller 26 receives as inputs the voltage command $V_{cmd}$ and the phase advance angle $\delta$ from the polar conversion controller 24. The PWM inverter controller 26 also receives a rotor angle value $\theta_r$ measured by the motor position sensor 34. In one exemplary embodiment, the PWM inverter controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the motor 32.

Determining the reference d-axis current $I_{d\_REF}$ and the reference q-axis current $I_{q\_REF}$ by the command current controller 20 will now be described. The command current controller 20 determines the reference d-axis current $I_{d\_REF}$ and the reference q-axis current $I_{q\_REF}$ based on the torque reference command $T_e$, the bridge voltage $V_{ecu}$, and the angular speed $\omega_m$ periodically. Specifically, the current command controller 20 determines the reference d-axis current $I_{d\_REF}$ and the reference q-axis current $I_{q\_REF}$ according to either a first region of operation RI or a second region of operation RII, which is described below.

The command current controller 20 first determines a peak current $I_{p\_REF}$ based on the torque reference command $T_e$. In one embodiment, the peak current $I_{p\_REF}$ may be determined by Equation 1:

$$I_{p\_REF} = (2 \cdot T_e)/(\sqrt{3} \cdot Ke) \quad \text{Equation 1}$$

where Ke is the motor constant.

The command current controller 20 may then determine a current angle $\beta$. The current angle $\beta$ represents an angle measured between the peak current $I_{p\_REF}$ and the reference q-axis current $I_{q\_REF}$. The command current controller 20 first determines a solution domain and a local current angle $\beta_{local}$. The solution domain and a local current angle $\beta_{local}$ are both used to determine the current angle $\beta$. A value for the current angle $\beta$ is found within the bounds of the solution domain. The solution domain may be defined by a starting point A and an ending point B, where the solution domain is expressed by [A, B]. In one exemplary embodiment, the starting point A is the local current angle multiplied by a constant (e.g., $C^*\beta_{local}$) and the ending point B is $\beta_{local}$, and the solution domain is expressed as $[C^*\beta_{local}, \beta_{local}]$, where the constant C ranges from 0 to 1. In one embodiment, the local current angle $\beta_{local}$ may be determined using Equation 2:

$$\frac{\partial T_{avr}}{\partial \beta} = \frac{\partial}{\partial \beta}\left(\begin{array}{c}\frac{\sqrt{3}}{2}K_e I_{p\_REF}\cos(\beta_{local}) + \\ \frac{3}{2}\frac{P}{2}(L_q - L_d)I_{p\_REF}^2 \frac{\sin(2\beta_{local})}{2}\end{array}\right) \quad \text{Equation 2}$$
$$= 0$$

where the peak current $I_{p\_REF}$ is determined by Equation 1 above, $L_q$ is the q-axis inductance, $L_d$ is the d-axis inductance, and P is the number of poles of the motor 32.

Once the solution domain and the local current angle $\beta_{local}$ are defined, the command current controller 20 may then determine the current angle $\beta$. The current angle $\beta$ may be determined by an iterative approach that uses the values for the solution domain and the local current angle $\beta_{local}$ as determined above. In the exemplary embodiment as described below, the current angle $\beta$ is determined by a bisection method. However it is to be understood that other iterative approaches may be used as well such as, for example, Newton's iteration method, or Newton's fixed point method.

If the bisection method is used, a bisection search is performed to find a value for the current angle $\beta$. The bisection search is limited between the starting point A and the ending point B of the solution domain, and determines a value for the current angle $\beta$ using Equations 3-4:

$$f(\beta) = k\_Torq\_K_2 \cdot \sin(2\beta)(1+\cos(2\beta)) - 2T_{avr} \cdot (\cos(2\beta))^2 \quad \text{Equation 3}$$

where k_Torq_$K_2$ is determined by Equation 4 as:

$$k\_Torq\_K_2 = \frac{\frac{3}{r}K_e^2}{\frac{3}{2}\frac{P}{2}(L_q - L_d)} \quad \text{Equation 4}$$

In one embodiment, the bisection search may be performed for two iterations. In the first iteration, the local current angle $\beta_{local}$ as determined in Equation 2 is substituted for $\beta$ in Equation 3. In the second iteration, the current angle $\beta$ as determined in the first iteration is substituted for $\beta$ in Equation 3. The bisection search is generally limited to two iterations in order to reduce computational time. It is understood more than two iterations may be used, however, increasing the number of iterations also increases computational time. Once the current angle $\beta$ has been calculated using the bisection search, the command current controller 20 may then re-calculate the peak current $I_{p\_REF}$ based on the current angle $\beta$ as determined using the bisection search. In one embodiment, the peak current $I_{p\_REF}$ is determined by Equation 5:

$$I_{p\_REF} = \frac{\frac{\sqrt{3}}{2}K_e \sin(\beta)}{\frac{3}{2}\frac{P}{2}(L_q-L_d)\cos(2\beta)} \qquad \text{Equation 5}$$

The reference d-axis current $I_{d\_REF}$ may then be determined based on the re-calculated peak current $I_{p\_REF}$ determined in Equation 5. In one embodiment, the reference d-axis current $I_{d\_REF}$ may be determined using Equation 6:

$$I_{d\_REF}=I_{p\_REF}*\sin\beta \qquad \text{Equation 6}$$

The current command controller 20 may then determine the reference q-axis current $I_{q\_REF}$ using the reference d-axis current $I_{d\_REF}$ as calculated in Equation 6, and the torque reference command $T_e$. In one embodiment, the reference q-axis current $I_{q\_REF}$ is determined using Equation 7:

$$I_{q\_REF}=T_e/(\sqrt{3}/2*Ke+(3/2(P/2)(L_q-L_d)*I_{d\_REF}) \qquad \text{Equation 7}$$

The command current controller 20 determines the voltage command $V_{cmd}$ based on the reference d-axis current $I_{d\_REF}$ as calculated in Equation 6, and the reference q-axis current $I_{q\_REF}$ as determined Equation 7. In one embodiment, the voltage command $V_{cmd}$ is determined by Equations 8-12:

$$V_{QFF}=R*I_{q\_REF}*\sqrt{3}*Ke*\omega_m-2*X_d*I_{d\_REF} \qquad \text{Equation 8}$$

$$V_{DFF}=R*I_{d\_REF}+2*X_q*I_{q\_REF} \qquad \text{Equation 9}$$

$$X_q=(k\_P/2)*\omega_m*L_q \qquad \text{Equation 10}$$

$$X_d=(k\_P/2)*\omega_m*L_d \qquad \text{Equation 11}$$

$$V_{cmd}=\sqrt{V_{QFF}^2+V_{DFF}^2} \qquad \text{Equation 12}$$

where $V_{QFF}$ is the feed forward q-axis voltage, $\omega_m$ is the angular speed of the motor 32, $V_{DFF}$ is the feed forward d-axis voltage, R is resistance per phase of the motor 32, $X_d$ is a d-axis reactance, and $X_q$ is a q-axis reactance.

Once the voltage command $V_{cmd}$ is determined, the command current controller 20 compares the magnitude of the voltage command $V_{cmd}$ with the bridge voltage $V_{ecu}$. If the voltage command $V_{cmd}$ is less than the bridge voltage $V_{ecu}$, then the current command controller 20 determines the reference d-axis current $I_{d\_REF}$ and the reference q-axis current $I_{q\_REF}$ based on the first region of operation RI. In the first region of operation RI, the reference d-axis current $I_{d\_REF}$ is determined using Equation 6 above, and the reference q-axis current $I_{q\_REF}$ is determined using Equation 7 above.

If the voltage command $V_{cmd}$ is greater than or equal to the bridge voltage $V_{ecu}$, then the current command controller 20 determines the reference d-axis current $I_{d\_REF}$ and the reference q-axis current $I_{q\_REF}$ based on the second region of operation RII. In the second region of operation RII, the reference d-axis current $I_{d\_REF}$ is determined based on a target voltage circle approach by first determining Equations 13-17:

$$Z_{q\_sqr}=R^2+X_q^2 \qquad \text{Equation 13}$$

$$Z_{d\_sqr}=R^2+X_d^2 \qquad \text{Equation 14}$$

$$B_{Dax}=I_{q\_REF}*R*(X_q-X_d)-2*Ke\sqrt{3}*\omega_m*X_d \qquad \text{Equation 15}$$

$$C_{Dax}=I_{q\_REF}^2*Z_{q\_sqr}+Ke\sqrt{3}*\omega_m*R*I_{qref}+(Ke/\sqrt{3}*\omega_m)^2-V_{ecu}^2/3 \qquad \text{Equation 16}$$

$$S_{Dax}=B_{Dax}^2-4*Z_{d\_sqr}*C_{Dax} \qquad \text{Equation 17}$$

where $Z_{q\_sqr}$ is a q-axis impedance of the motor 32 squared, $Z_{d\_sqr}$ is a d-axis impedance squared, $B_{Dax}$, $C_{Dax}$ and $S_{Dax}$ are variables based on the target voltage circle, and $I_{q\_REF}$ is determined using Equation 7 above. The reference d-axis current $I_{d\_REF}$ may then be determined by the following d-axis target voltage circle algorithm:

If $S_{Dax}>=0$, then $I_{d\_REF}=(-B_{Dax}-\sqrt{S_{Dax}})/(2*Z_{d\_sqr})$

Else $I_{d\_REF}=(-B_{Dax})/(2*Z_{d\_sqr})$ where the reference d-axis current $I_{d\_REF}$ is calculated based on the variable $S_{Dax}$.

The current command controller 20 may re-calculate the reference q-axis current $I_{q\_REF}$ based on the target voltage circle approach using Equations 18-20, where:

$$B_{Qax}=I_{d\_REF}*R*(X_q-X_d)+2*Ke\sqrt{3}\omega_m*R \qquad \text{Equation 18}$$

$$C_{Qax}=I_{d\_REF}^2*Z_{d\_sqr}-Ke\sqrt{3}\omega_m*X_d*I_{dref}+(Ke/\sqrt{3}\omega_m)^2-V_{ecu}^2/3 \qquad \text{Equation 19}$$

$$S_{Qax}=B_{Qax}^2-4*Z_{q\_sqr}*C_{Qax} \qquad \text{Equation 20}$$

where $I_{d\_REF}$ is determined using Equations 13-17 above. The reference q-axis current $I_{q\_REF}$ may then be determined using the following q-axis target voltage circle algorithm:

If $S_{Qax}>=0$, then $I_{q\_REF}=(-B_{Qax}-\text{sqrt}(S_{Qax}))/(2*Z_{q\_sqr})$ Else $I_{q\_REF}=(=B_{Qax})/(2*Z_{q\_sqr})$ Once the reference d-axis current $I_{d\_REF}$ and the reference q-axis current $I_{q\_REF}$ are both determined using either the first region of operation RI or the second region of operation RII, the command current controller 20 may then re-calculate the feed forward q-axis voltage $V_{QFF}$ and the feed forward d-axis voltage $V_{DFF}$ according to Equations 8-9 above, and save the feed forward q-axis voltage $V_{QFF}$ and the feed forward d-axis voltage $V_{DFF}$ in memory.

Figure 2:
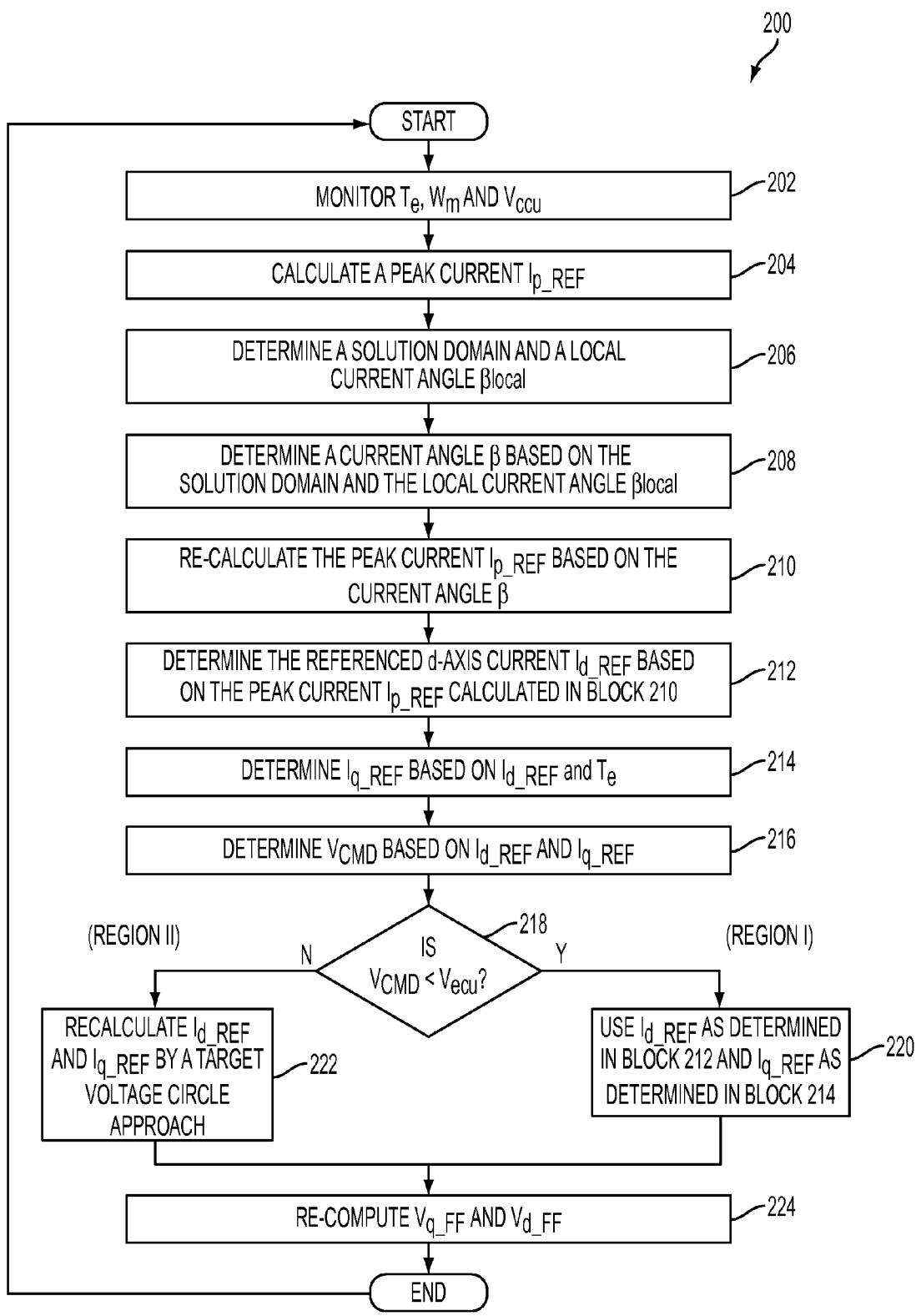
FIG. 2 is a process flow diagram for determining a reference d-axis current and a reference q-axis current, in accordance with another exemplary embodiment of the invention.

FIG. 2 is an exemplary process flow diagram illustrating a method 200 for determining the reference d-axis current $I_{d\_REF}$ and the reference q-axis current $I_{q\_REF}$. Referring now to both FIGS. 1-2, the method 200 may begin at block 202, where the current command controller 20 receives as input the torque reference command $T_e$, the angular speed $\omega_m$, and the bridge voltage $V_{ecu}$. Method 200 may then proceed to block 204.

In block 204, the command current controller 20 determines the peak current $I_{p\_REF}$. In one embodiment, the peak current $I_{p\_REF}$ may be determined using Equation 1 above. Method 200 may then proceed to block 206.

In block 206, the command current controller 20 determines the solution domain and the local current angle $\beta_{local}$. The solution domain may be defined by the starting point A and the ending point B, and expressed as [A, B]. In one exemplary embodiment, the starting point A is $C*\beta_{local}$ and the ending point B is $\beta_{local}$, and the solution domain is expressed as $[C*\beta_{local}, \beta_{local}]$. In one embodiment, the local current angle $\beta_{local}$ may be determined using Equation 2 as described above. Method 200 may then proceed to block 208.

In block 208, the command current controller 20 determines the current angle $\beta$. The current angle $\beta$ may be determined by an iterative approach that uses the values for the solution domain and the local current angle $\beta_{local}$ as determined in block 206. In one embodiment, the iterative approach is the bisection method, however it is to be understood that other iterative approaches such as, for example, Newton's iteration method, or Newton's fixed point method may also be used. Method 200 may then proceed to block 210.

In block 210, the command current controller 20 re-calculates the peak current $I_{p\_REF}$ based on the current angle β determined in block 208 using Equation 5 as described above. Method 200 may then proceed to block 212.

In block 212, the command current controller 20 determines the reference d-axis current $I_{d\_REF}$ based on the re-calculated peak current $I_{p\_REF}$ determined in block 210 using Equation 6 as described above. Method 200 may then proceed to block 214.

In block 214, the current command controller 20 determines the reference q-axis current $I_{q\_REF}$ based on the reference d-axis current $I_{d\_REF}$ as calculated block 212, and the torque reference command $T_e$ using Equation 7 as described above. Method 200 may then proceed to block 216.

In block 216, the command current controller 20 determines the voltage command $V_{cmd}$ based on the reference d-axis current $I_{d\_REF}$ as determined in block 212, and the reference q-axis current $I_{q\_REF}$ as determined in block 214. In one embodiment, the voltage command $V_{cmd}$ is determined by Equations 8-12 as described above. Method 200 may then proceed to block 218.

In block 218, the command current controller 20 determines if the voltage command $V_{cmd}$ is less than the bridge voltage $V_{ecu}$. If the answer is yes, then method 200 proceeds to block 220. In block 220, the current command controller 20 determines the reference d-axis current $I_{d\_REF}$ and the reference q-axis current $I_{q\_REF}$ based on the first region of operation RI. In the first region of operation RI, the reference d-axis current $I_{d\_REF}$ is determined in block 212, and the reference q-axis current $I_{q\_REF}$ is determined in block 214.

However, if the answer is no in block 218 (i.e., the voltage command $V_{cmd}$ is greater than or equal to the bridge voltage $V_{ecu}$), then method 200 proceeds to block 222. In block 222, the current command controller 20 determines the reference d-axis current $I_{d\_REF}$ and the reference q-axis current $I_{q\_REF}$ based on the second region of operation RII. In the second region of operation RE, the reference d-axis current $I_{d\_REF}$ and the reference q-axis current $I_{q\_REF}$ are determined based on the target voltage circle using equations 13-20.

Method 200 may proceed from either block 220 or block 222 to block 224. In block 224, the current command controller 20 may re-calculate the feed forward q-axis voltage $V_{QFF}$ and the feed forward d-axis voltage $V_{DFF}$ according to Equations 8-9 above, and save the feed forward q-axis voltage $V_{QFF}$ and the feed forward d-axis voltage $V_{DFF}$ in memory. Method 200 may then repeat, or terminate.

The current command controller 20 as described above determines the reference d-axis current $I_{d\_REF}$ based on the current angle β, and the reference q-axis current $I_{q\_REF}$ based on the reference d-axis current $I_{d\_REF}$ and the torque command $T_e$. The current angle β is determined using an iterative approach (e.g., the bisection method) with a reduced or limited number of iterations, which in turn results in reduced computational time needed to determine the current angle β. The computational time is also reduced by selecting the solution domain that contains the current angle β.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A motor control system for determining a reference d-axis current, comprising:
   a motor;
   a DC power source and DC input lines, the DC power source generating a bridge voltage across the DC input lines; and
   a current command controller in communication with the motor and the DC input lines, the current command controller configured to:
   monitor the bridge voltage and a torque reference command;
   determine a peak current based on the torque reference command;
   determine a current angle based on the peak current; and
   determine the reference d-axis current based on the current angle,
   wherein a value for the current angle is found within a solution domain,
   wherein the solution domain is defined by a starting point and an ending point,
   wherein the starting point is defined as a local current angle multiplied by a constant and the ending point is the local current angle.

2. The motor control system of claim 1, wherein the current angle is determined based on an iterative approach.

3. The motor control system of claim 2, wherein the iterative approach is a bisection method, and wherein a bisection search is performed to find a value for the current angle.

4. The motor control system of claim 1, wherein the current command controller determines a reference q-axis current based on the reference d-axis current and the torque reference command.

5. The motor control system of claim 4, wherein the current command controller determines a voltage command based on the reference d-axis current $I_{d\_REF}$ and the reference q-axis current.

6. A motor control system for determining a reference d-axis current, comprising:
   a motor;
   a DC power source and DC input lines, the DC power source generating a bridge voltage across the DC input lines; and
   a current command controller in communication with the motor and the DC input lines, the current command controller configured to:
   monitor the bridge voltage and a torque reference command;
   determine a peak current based on the torque reference command;
   determine a current angle based on the peak current; and
   determine the reference d-axis current based on the current angle,
   wherein the current command controller determines a reference q-axis current based on the reference d-axis current and the torque reference command,
   wherein the reference q-axis command is determined by:

$$I_{q\_REF}=T_e/(\sqrt{3}/2*Ke+(3/2(P/2)(L_q-L_d)*I_{d\_REF}$$

wherein $I_{q\_REF}$ is the reference q-axis command, $T_e$ is the torque reference command, Ke is a motor constant, P is a number of poles of the motor, $L_q$ is a q-axis inductance, $L_d$ is a d-axis inductance, and $I_{d\_REF}$ is the reference d-axis current.

7. The motor control system of claim 6, wherein the current angle is determined based on an iterative approach.

8. The motor control system of claim 7, wherein the iterative approach is a bisection method, and wherein a bisection search is performed to find a value for the current angle.

9. The motor control system of claim 6, wherein the current command controller determines a voltage command based on the reference d-axis current $I_{d\_REF}$ and the reference q-axis current.

10. A motor control system for determining a reference d-axis current, comprising:
a motor;
a DC power source and DC input lines, the DC power source generating a bridge voltage across the DC input lines; and
a current command controller in communication with the motor and the DC input lines, the current command controller configured to:
monitor the bridge voltage and a torque reference command;
determine a peak current based on the torque reference command;
determine a current angle based on the peak current; and
determine the reference d-axis current based on the current angle,
wherein the current command controller determines a reference q-axis current based on the reference d-axis current and the torque reference command,
wherein the current command controller determines a voltage command based on the reference d-axis current $I_{d\_REF}$ and the reference q-axis current,
wherein current command controller determines the reference d-axis current $I_{d\_REF}$ and the reference q-axis current based on a first region of operation if the voltage command is less than the bridge voltage.

11. A motor control system for determining a reference d-axis current, comprising:
a motor;
a DC power source and DC input lines, the DC power source generating a bridge voltage across the DC input lines; and
a current command controller in communication with the motor and the DC input lines, the current command controller configured to:
monitor the bridge voltage and a torque reference command;
determine a peak current based on the torque reference command;
determine a current angle based on the peak current; and
determine the reference d-axis current based on the current angle,
wherein the current command controller determines a reference q-axis current based on the reference d-axis current and the torque reference command,
wherein the current command controller determines a voltage command based on the reference d-axis current $I_{d\_REF}$ and the reference q-axis current,
wherein current command controller determines the reference d-axis current $I_{d\_REF}$ and the reference q-axis current based on a second region of operation if the voltage command is greater than or equal to the bridge voltage.

12. A method of determining a reference d-axis current for a motor, comprising:
monitoring a bridge voltage and a torque reference command by a current command controller, the bridge voltage generated by a DC source across DC input lines;
determining a peak current based on the torque reference command;
determining a current angle based on the peak current, wherein a value for the current angle is found within a solution domain;
determining the reference d-axis current based on the current angle;
defining the solution domain by a starting point and an ending point; and
defining the starting point as a local current angle multiplied by a constant and the ending point is the local current angle.

13. The method of claim 12, further comprising determining the current angle based on an iterative approach.

14. The method of claim 13, wherein the iterative approach is a bisection method, and wherein a bisection search is performed to find a value for the current angle.

15. The method of claim 12, further comprising determining a reference q-axis current based on the reference d-axis current and the torque reference command.

16. The method of claim 15, further comprising determining a voltage command based on the reference d-axis current $I_{d\_REF}$ and the reference q-axis current.

17. A method of determining a reference d-axis current for a motor, comprising:
monitoring a bridge voltage and a torque reference command by a current command controller the bridge voltage generated by a DC source across DC input lines;
determining a peak current based on the torque reference command;
determining a current angle based on the peak current, wherein a value for the current angle is found within a solution domain;
determining the reference d-axis current based on the current angle; and
determining a reference q-axis current based on the reference d-axis current and the torque reference command,
wherein the reference q-axis command is determined by:

$$I_{q\_REF}=T_e/(\sqrt{3}/2 * Ke+(3/2(P/2)(L_q-L_d)*I_{d\_REF}$$

wherein $I_{q\_REF}$ is the reference q-axis command, $T_e$ is the torque reference command, Ke is a motor constant, P is a number of poles of the motor, $L_q$ is a q-axis inductance, $L_d$ is a d-axis inductance, and $I_{d\_REF}$ is the reference d-axis current.

18. The method of claim 17, wherein the current angle is determined based on an iterative approach.

19. The method of claim 18, wherein the iterative approach is a bisection method, and wherein a bisection search is performed to find a value for the current angle.

20. The method of claim 17, wherein the current command controller determines a voltage command based on the reference d-axis current $I_{d\_REF}$ and the reference q-axis current.

* * * * *